US007941761B2

(12) United States Patent
Hally et al.

(10) Patent No.: US 7,941,761 B2
(45) Date of Patent: May 10, 2011

(54) THIRD PARTY SERVICE SWITCHING THROUGH COMMAND BAR USER INTERFACE

(75) Inventors: Judson Craig Hally, Sammamish, WA (US); Richard S. Goade, Kent, WA (US); W. Michael Anderson, Woodinville, WA (US); Jonathan M. Cain, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/993,976

(22) Filed: Nov. 19, 2004

(65) Prior Publication Data
US 2005/0246654 A1 Nov. 3, 2005

Related U.S. Application Data

(63) Continuation-in-part of application No. 10/838,645, filed on May 3, 2004.

(51) Int. Cl.
*G06F 3/048* (2006.01)
(52) U.S. Cl. ........................................ 715/779; 715/840
(58) Field of Classification Search .................. 715/779, 715/826, 749, 840
See application file for complete search history.

(56) References Cited

U.S. PATENT DOCUMENTS

| | | | |
|---|---|---|---|
| 5,204,947 A * | 4/1993 | Bernstein et al. | ............. 715/854 |
| 6,035,304 A | 3/2000 | Machida et al. | |
| 6,248,946 B1 * | 6/2001 | Dwek | .............................. 84/609 |
| 6,460,082 B1 | 10/2002 | Lumelsky et al. | |
| 6,484,150 B1 | 11/2002 | Blinn et al. | |
| 6,529,950 B1 | 3/2003 | Lumelsky et al. | |
| 6,587,127 B1 | 7/2003 | Leeke et al. | |
| 6,587,837 B1 | 7/2003 | Spagna et al. | |
| 6,628,305 B1 | 9/2003 | Hong et al. | |
| 6,633,907 B1 | 10/2003 | Spencer et al. | |
| 6,677,964 B1 * | 1/2004 | Nason et al. | .................. 715/764 |
| 6,711,682 B1 | 3/2004 | Capps | |
| 6,714,723 B2 | 3/2004 | Abecassis | |
| 6,742,026 B1 | 5/2004 | Kraenzel et al. | |
| 7,107,548 B2 * | 9/2006 | Shafron | ........................ 715/826 |
| 2001/0003828 A1 * | 6/2001 | Peterson et al. | ............. 709/219 |
| 2003/0145096 A1 | 7/2003 | Breiter et al. | |

(Continued)

FOREIGN PATENT DOCUMENTS

EP 1223504 7/2002

(Continued)

OTHER PUBLICATIONS

Laramee, "Laramedla Inc. an Internet Distribution Network for Commercial Audio" IEEE 2003 pp. 3-11.

(Continued)

*Primary Examiner* — Sara England
*Assistant Examiner* — Omar Abdul-Ali
(74) *Attorney, Agent, or Firm* — Lee & Hayes, PLLC

(57) ABSTRACT

A graphical user interface allows users to access multiple third party services (e.g., online media services) and enables the services to provide functionality within the GUI adjacent to core functionality of a host application (e.g., a media player application, operating system shell, etc.). The GUI provides an interface region for third party service functionality that is distinct from, but equal in exposure and prominence to, the core functionality provided by the application hosting the GUI. The GUI enables seamless switching between a list of available services provided in a service menu. Switching between services replaces service function buttons and service branding according to particular service customizations.

21 Claims, 12 Drawing Sheets

U.S. PATENT DOCUMENTS

| | | | |
|---|---|---|---|
| 2004/0061720 A1* | 4/2004 | Weber | 345/760 |
| 2004/0068536 A1* | 4/2004 | Demers et al. | 709/201 |
| 2004/0078812 A1 | 4/2004 | Calvert | |
| 2004/0248561 A1 | 12/2004 | Nykanen et al. | |
| 2005/0091107 A1* | 4/2005 | Blum | 705/14 |
| 2005/0114789 A1* | 5/2005 | Chang et al. | 715/779 |
| 2005/0235219 A1* | 10/2005 | Szeto | 715/788 |
| 2005/0246654 A1 | 11/2005 | Hally et al. | |
| 2006/0015581 A1 | 1/2006 | Breiter et al. | |

FOREIGN PATENT DOCUMENTS

| | | |
|---|---|---|
| JP | 11032272(A) | 2/1999 |
| JP | 2001125961(A) | 5/2001 |
| JP | 2002215573(A) | 8/2002 |
| WO | WO9843150(A2) | 10/1998 |

OTHER PUBLICATIONS

Li, et al., "MediaPlayer versus RealPlayer—A Comparison of Network Turbulence" ACM 2002 pp. 131-136.

Rasheed, et al, "High-Quality Media Distribution in the Digital Home" Intel Technology Journal vol. 6 Issue 4 Nov. 15, 2002 pp. 17-29.

ProQuest, "Launch Media Debuts Revolutional New Music Services: LAUNCHcast; LAUNCH.com Delivers "Music that listens to you"-SM-", Business Wire, Nov. 11, 1999, 2 pages.

ProQuest, "LAUNCH.com Announces Availability of LAUNCHcast for Music Fans; More than 100,000 Users join Ulitmate Streaming Musica Service During Beta Preview; [1]", Retrieved Nov. 8, 2009, from Business Dateline (49770351), 2 pages.

ProQuest, "Microsoft Transforms Audio and Video Experience on the PC with Release of Windows Media Player 7 Beta", May 2, 2000, Business Dateline, 5 pages.

ProQuest, "T-Online Adopts Window Media as Digital Media Platform", Jan. 31, 2000, Business Dateline, 3 pages.

The Washington Post, "Opening a New Windows", Oct. 21, 2001, Business Dateline, 5 pages.

Once, "Breakthrough in the High Quality Network Video Era", Windows Media 9 Series, Video A, vol. 19, No. 3, pp. 65-68, Mar. 2003.

* cited by examiner

214

```
<Services Version="1.00">
    <Default Key="MSN"/>
    <Browse URL="http://wmpsrv/sharedcontent/premiumservice/internal/Browse.htm" />
    <Service Key="MSN" XMLURL="http://wmpsrv/sharedcontent/premiumservice/internal/MSNn.xml"
    Pos="1" Type="1">
        <FriendlyName>MSN Music</FriendlyName>
        <Image MenuURL="http://mikkya02/music/msnsmall.png"/
    </Service>
    <Service Key="MSNDemo" XMLURL="http://mikkya02/music/mikkya02msn.xml" Pos="2" Type="1">
        <FriendlyName>MSN Music (Demo)</FriendlyName>
        <Image MenuURL="http://mikkya02/music/msnsmall.png"/
    </Service>
    <Service Key="Test" XMLURL="http://beta.windowsmedia.com/serviceswitching/xml/test.xml"
    Pos="3" Type="2">
        <FriendlyName>Test (MS) Service</FriendlyName>
        <Image MenuURL="http://mikkya02/music/msnsmall.png"/
    </Service>
</Services>
```

```
<ServiceInfo Version="1.00" Key="Scottav24-Rock">
    <FriendlyName>Scott Rocks</FriendlyName>
    <Image MenuURL="http://Scottav24/Rock/rock.jpg" ServiceSmallURL="http://Scottav24/Rock/
    rockS.jpg" ServiceLargeURL="http://Scottav24/Rock/rockL.jpg" />
    <Color MediaPlayer="#FF8040" />
    <ServiceTask1 URL="http://Scottav24/Rock/Guide.asp">
        <ButtonText>Scott Store</ButtonText>
        <ButtonTip>Scott Rocks is the coolest</ButtonTip>
    </ServiceTask1>
    <ServiceTask2 URL="http://Scottav24/Rock/Service.asp">
        <ButtonText>Scott Movies</ButtonText>
        <ButtonTip>Scott Rocks is the coolest</ButtonTip>
    </ServiceTask2>
    < ServiceTask3 URL="http://Scottav24/Rock/Radio.asp">
        <ButtonText>Scott Radio</ButtonText>
        <ButtonTip>Scott Rocks is the coolest</ButtonTip>
    </ServiceTask3>
    <InfoCenter URL="http://Scottav24/Rock/Radio.asp" />
    <AlbumInfo URL="http://Scottav24/Rock/Album.asp" />
    <BuyCD MediaPlayerURL="http://Scottav24/Rock/BuyCD.asp?showin=WMP"
    MediaCenterURL="http://Scottav24/Rock/BuyCD.asp?showin=MCE" BrowserURL="http://Scottav24/
    Rock/BuyCD.asp?showin=IE" />
    <Install EULAURL="http://Scottav24/Rock/EULA.txt" CodeURL="http://Scottav24/Rock/EULA.txt"/>
    <HTMLView BaseURL="http://Scottav24/Rock/Radio.asp" />
</ServiceInfo>
```

*Fig. 9*

THIRD PARTY SERVICE SWITCHING THROUGH COMMAND BAR USER INTERFACE

RELATED CASES

This application is a continuation in part to U.S. patent application Ser. No. 10/838,645, filed May 3, 2004, titled "Online Service Switching And Customizations".

TECHNICAL FIELD

The present disclosure generally relates to a graphical user interface, and more particularly to enabling third party service selection, customization, and functionality within regions of the graphical user interface that are adjacent to core functionality being provided by a host application.

BACKGROUND

Most media player applications provide a range of features that enable users to discover, acquire, and use media content. In addition, the exposure to, and use of, media content (e.g., through online media services, etc.) is increasingly becoming part of a user media experience that is relevant to other applications and to an overall operating system environment. With the exception of providing the media content itself, most media players provide and control all aspects of the user experience. That is, the media player controls the experience with respect to discovering and acquiring online media, in addition to providing a broad range of features for using the media, such as playing the media, burning the media (e.g., music files) to a CD, and transferring the media to a portable device.

There are various ways for online media services to advertise and deliver media content to customers/users. For example, in one scenario, users can use a browser application to browse media service Web pages and search for media content, and then purchase and download desired content through the browser application and mechanisms provided by the media service. In this case, the media discovery and acquisition process is generally controlled by the media service itself. From the media service's point of view, being able to control the media discovery and acquisition experience in this manner is a benefit, as it provides the service with the opportunity to attract more users through its own innovative and dynamic presentation of media content.

In another scenario, media services can deliver content to users through agreements made with media player developers. A media service provides the media content, but the media player controls how the user discovers and acquires (and plays/consumes) the content. This lack of control over the discovery and acquisition of its content is problematic for media services, however. Some media services have attempted to overcome this problem by writing their own media players and providing them to users. Although this alternative gives a media service control over the discovery, acquisition and playback of the media content, it also has important disadvantages. In particular, the cost of developing a media player can be significant, which typically means that the resulting media player is unable to offer the rich playback features provided by other media players that are readily available to users.

From a user's view point, both of the scenarios discussed above can be problematic. For example, the first scenario discussed above provides a disjointed experience for the user. The user browses (i.e., with a browser application) media service Web pages in search of desired content, and then purchases and downloads the content. To use the content (e.g., play, burn to CD, transfer to portable player, etc.) the user must then initiate a separate action through a media player application. Thus, the experience is a disjointed and sometimes time consuming combination of steps that necessitates the use of different applications.

In the second scenario discussed above, the user is limited to media content that is made available through the media player application, as well as being limited to the presentation of that content as dictated by the media player application. The variety of content accessible to the user is therefore limited to content secured by the media player through agreements with various media services. A user who desires a wider variety of media content may not be able to find the content they want through the media player, and thus be relegated to using a browser application to search for their desired content in the same type of disjointed experience as discussed above.

Accordingly, from an end-user perspective, a need exists for a way to provide an uninterrupted media experience that includes the discovery, acquisition, and use of a variety of media content within a feature rich player environment specifically, and within an overall operating system environment more generally. From a media services perspective, a corresponding need exists for a way to enable media services to have control over the way users discover and acquire media for use within a feature rich player environment and/or an overall operating system environment.

SUMMARY

A graphical user interface allows users to access multiple third party services (e.g., online media services) and enables the services to provide functionality within the GUI adjacent to core functionality of a host application (e.g., a media player application, operating system shell, etc.) in a cohesive manner. The GUI provides an interface region for third party service functionality that is distinct from, but equal in exposure and prominence to, the core functionality provided by the application hosting the GUI. The GUI enables seamless switching between a list of available services provided in a service menu. Switching between services replaces service function buttons and service branding according to particular service customizations.

BRIEF DESCRIPTION OF THE DRAWINGS

The same reference numerals are used throughout the drawings to reference like components and features.

FIG. 8 illustrates an example of an all-services file.

FIG. 9 illustrates an example of a service information file.

DETAILED DESCRIPTION

Introduction

The following discussion is directed to a graphical user interface system and methods that enable switching between a plurality of online media services from within a host application, such as a PC-based media player application. A user can switch to any one of a number of online services made available in a services menu and thereby make that service the active service. In addition, the currently active online service is given customization opportunities that permit the active service to customize regions of the GUI in a host media player application or other application and/or operating system (e.g., active service provides a service information file that includes URLs to Web pages of the active service). Advantages of the described system and methods include providing online media services with an ability to control the way in which customers discover and purchase media from within the feature rich environment of various user applications such as a PC-based media player application. From a user's perspective, the advantages include an uninterrupted media experience that can involve the entire process of discovering, purchasing and using a wide variety of media content all from within the feature rich environment of a media player application.

Exemplary Service Switching and Customization Environment

Figure 1:
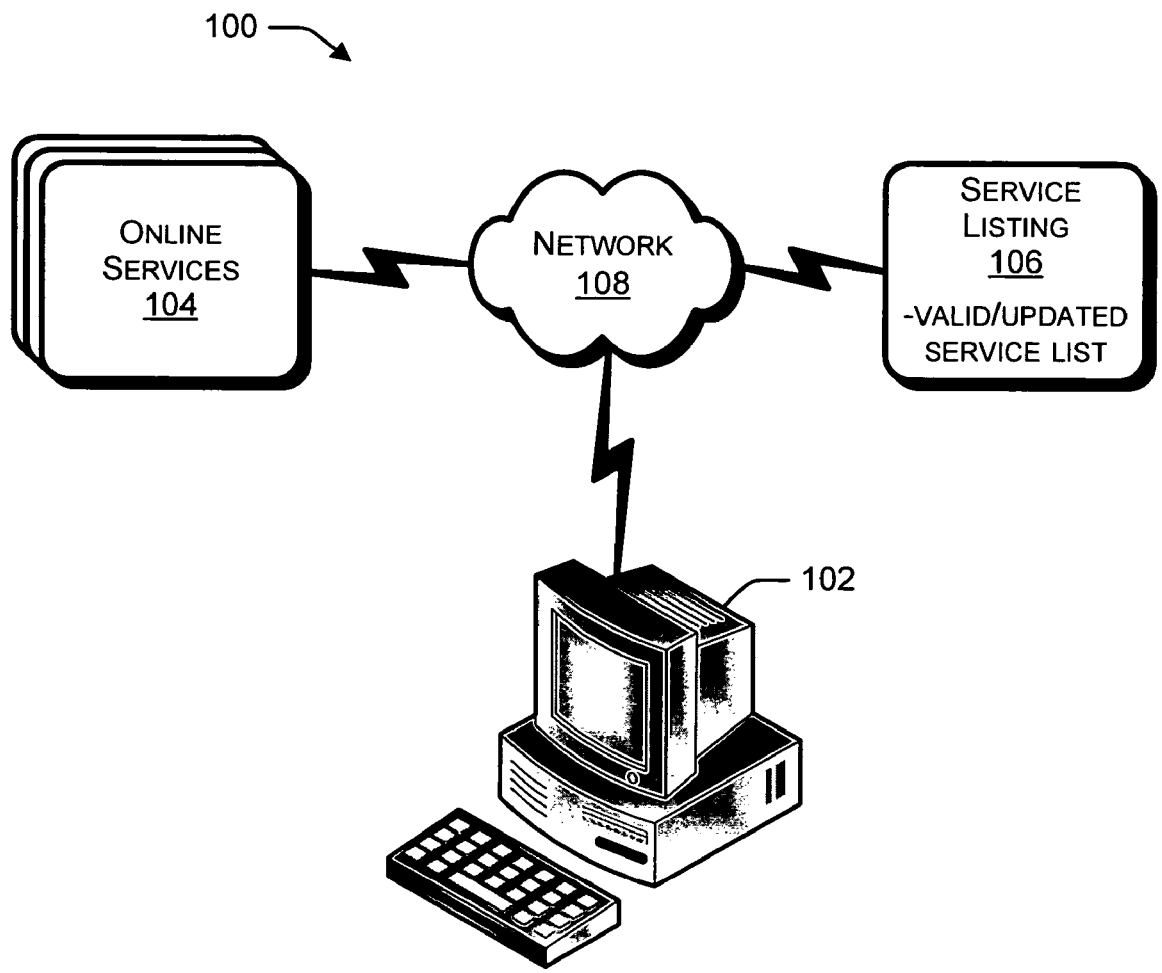
FIG. 1 illustrates an exemplary environment suitable for enabling switching between various online media services and allowing an active service to customize portions of an application on a computer.

FIG. 1 illustrates an exemplary system environment 100 suitable for enabling switching between various online media services and allowing an active service to customize portions of an application on a computer 102. The exemplary environment 100 includes computer 102 operatively coupled to a plurality of online services 104 and a Web listing service 106 via a network 108. Network 108 can include both local and remote connections depending on the particular system configuration. Thus, network 108 may include, for example, any one or a combination of a modem, a cable modem, a LAN (local area network), a WAN (wide area network), an intranet, the Internet, or any other suitable communication link.

Figure 12:
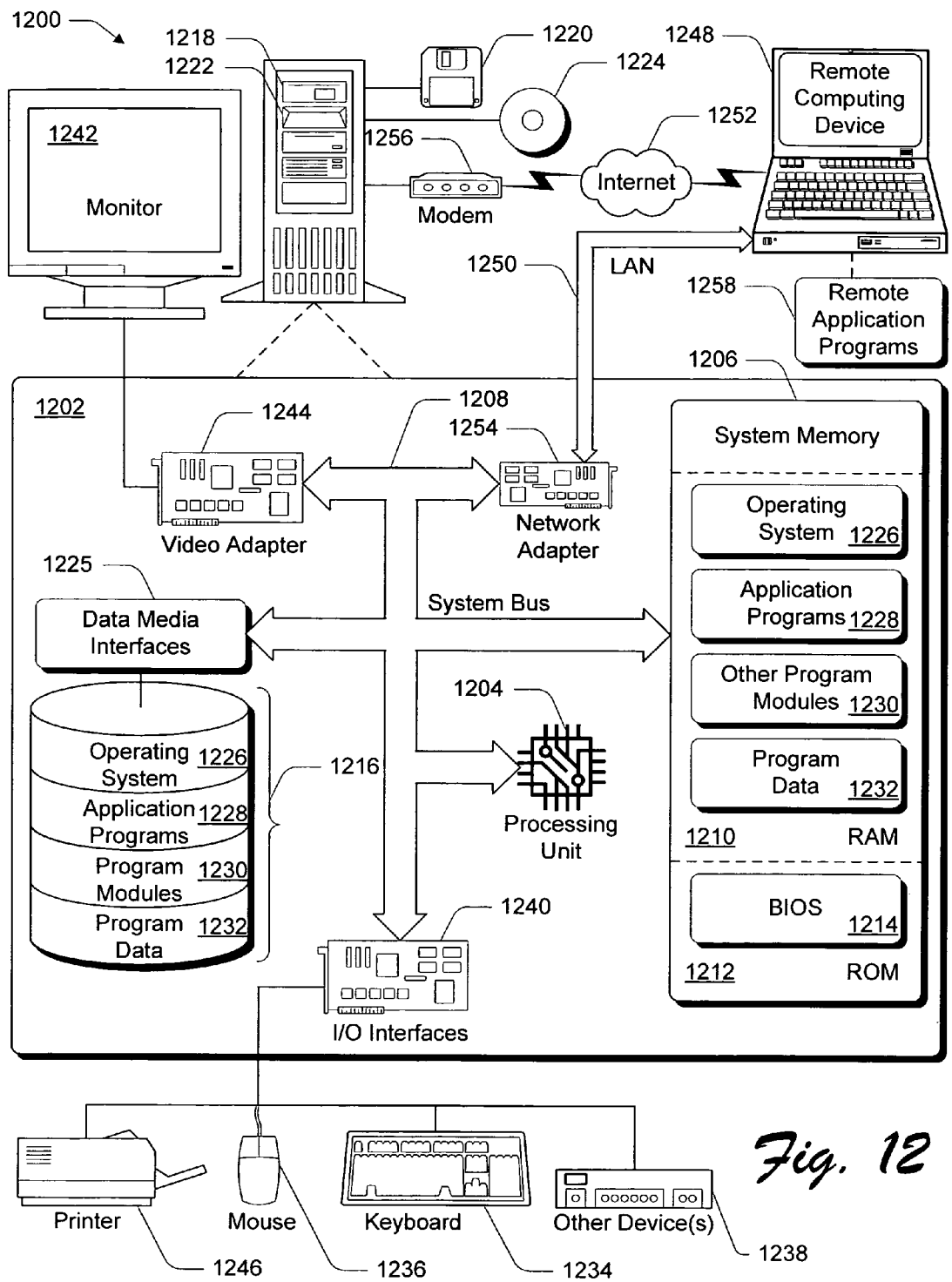
FIG. 12 illustrates an exemplary computing environment suitable for implementing a computer such as discussed with reference to FIGS. 1 through 9.

Computer 102 is typically implemented as a user's primary computing device, such as a desktop personal computer (PC). Computer 102 might also be implemented as other conventional computing devices generally configured to receive and render multi-media content (e.g., play back, burn to CD, transfer to portable playback device, etc.) from various online media services. An exemplary implementation of a computer 102 is depicted in FIG. 12 and described in greater detail below in the Exemplary Computing Environment section.

Online services 104 and Web listing service 106 are typically implemented as one or more server computers such as a Web server. Thus, online services 104 and Web listing service 106 may include a variety of general purpose computing devices such as workstation computers, and may be configured in a manner similar to an exemplary implementation of computer 102 such as described below in the Exemplary Computing Environment referring to FIG. 12. Online services 104 and Web listing service 106 generally provide storage for electronic documents and information including multi-media content that is accessible to client computers such as computer 102 over network 108.

Exemplary Embodiments

Figure 2:
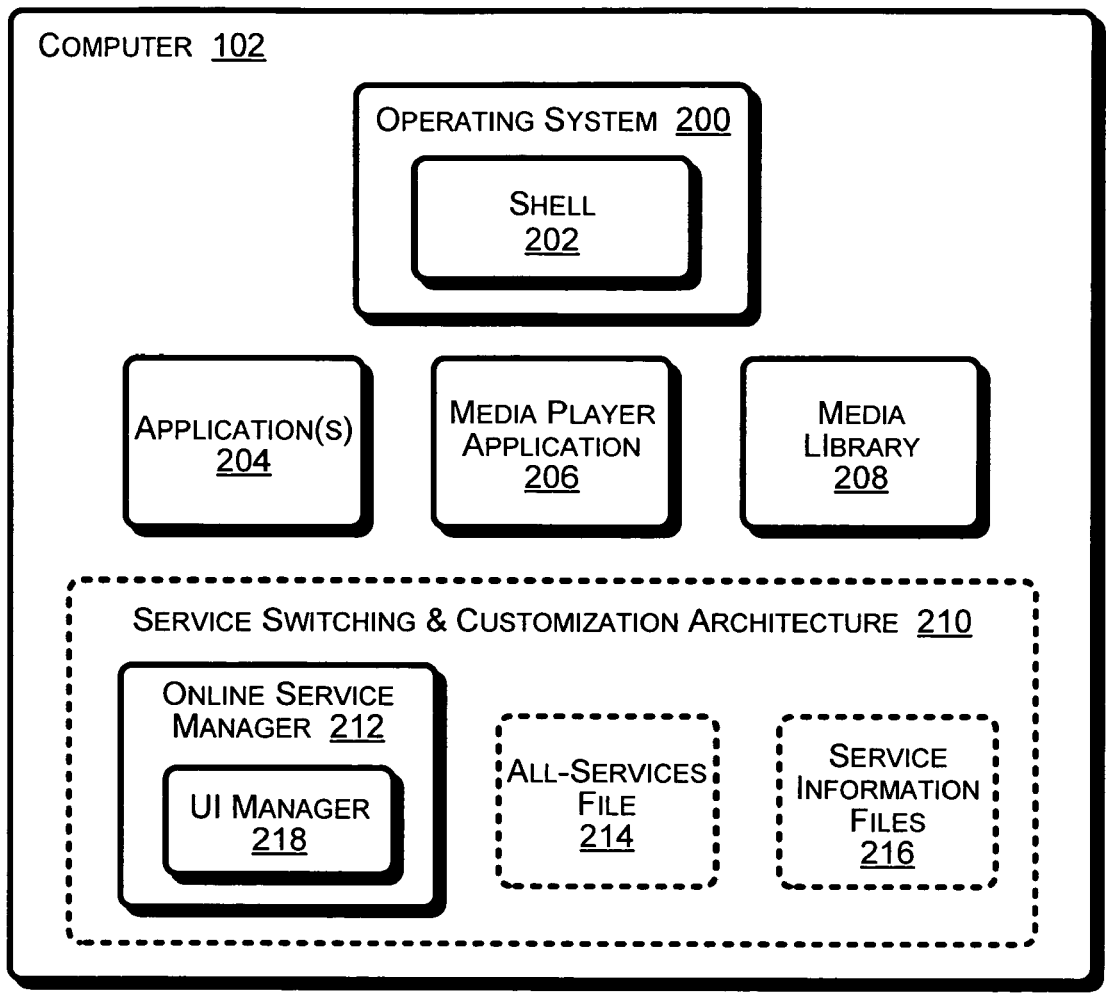
FIG. 2 illustrates a block diagram representation of an exemplary computer that is suitable for enabling switching between various online media services and allowing an active service to customize portions of an application on the computer.

FIG. 2 illustrates a block diagram representation of an exemplary computer 102 that is suitable for enabling switching between various online media services 104 and allowing an active service to customize portions of an application on a computer 102. Various components on computer 102 facilitate the retrieval and management of media content for the general purpose of rendering the content on computer 102 and/or synchronizing the content with a portable playback device. These components include, for example, an operating system 200 and its sub-components (e.g., the operating system's folder system application, or "Shell" 202), various applications 204 such as, specifically, a media player 206, a media library 208 (i.e., a database that contains digital media files), and a service switching and customization architecture 210. Although these components are illustrated separately on computer 102, it is noted that any one or more of these components may be implemented on computer 102 as part of a multimedia software product, the operating system 200, stand-alone components, and so on.

An application 204 may be any of various applications and/or tools configured to perform various computing tasks such as emailing, word processing, financial analysis, and so on. An application 204 may also be an application or tool configured to receive and manipulate media content, such as from an online media service 104 or some other source. For example, application 204 may be an interactive TV service application that facilitates the recording of video (e.g., TV programming) directly off of a cable and/or satellite feed, a video capture component to transfer home video footage from a digital video recorder onto computer 102, a Web browser application that facilitates downloading media over a network 108, and so on. Thus, applications 204 may supply various forms of media content to a media library 208 on computer 102. Media content stored in media library 208 may include, for example, audio files in the form of MP3 and WMA files, video files in the form of AVI and MOV files, and image files in the form of GIF and JPEG files, and so on.

A specific example of an application 204 that is illustrated in FIG. 2 is a media player application 206. A media player application 206 is typically a desktop based media player that manages a broad range of multimedia related tasks regarding the discovery, acquisition and use of media content. For example, a media player application 206 may handle streaming audio and video, CD/DVD playback, MP3 and WMA support, encoding, CD/DVD burning, transferring media to a portable playback device, Internet radio, and the like. Like some other applications 204, a media player application 206 supplies various forms of media content (e.g., audio files, video files, image files, etc.) to media library 208 on computer 102. Although the media player application 206 and media library 208 are illustrated in FIG. 2 and discussed herein as separate components on computer 102, in other embodiments they may just as readily be a part of the operating system 200 itself.

A service switching and customization architecture 210 is configured to be operatively interactive with any one or more of the components of computer 102 noted above for the general purpose of enabling switching between various online media services 104 and allowing an active service to customize portions of such components on computer 102. Thus, one or more applications 204 and/or components of computer 102 (e.g., operating system 200, shell 202) may "host" the service switching and customization architecture 210. For example, in one embodiment, the service switching and customization architecture 210 may be an integral component of, and/or operatively interactive with, the media player application 206. Accordingly, although the current embodiment of the service switching and customization architecture 210 will be discussed herein with specific reference to the media player application 206 as a host application, various aspects of service switching and customization may be hosted by and/or be generally applicable in similar ways to various components of computer 102 including, for example, the operating system 200 and its sub-components (e.g., shell 202), and various other applications 204.

The service switching and customization architecture 210 includes an online service manager component 212, an all-services file 214, and a number of service information files 216. The online service manager 212 is generally configured to populate a service menu list within the media player 206, and to manage switching between online services and to manage customizations made to the player that are provided by a currently active service. Each time computer 102 is connected to the network 108, the online service manager 212 fetches the all-services file 214 from a Web service listing 106. In the current embodiment, the all-services file 214 is an XML (Extended Markup Language) file that is kept up-to-date on the Web service listing 106 so that the online service manager 212 always has access to the latest list of valid online services 104. The all-services file 214 includes a list of all valid online services 104 and any other information needed to populate a service menu list within the media player 206. As discussed in more detail below, the online service manager 212 uses information in the all-services file 214 to determine where to retrieve a service information file 216 for each of the valid services identified in the all-services file 214.

When a valid all-services file 214 is retrieved from Web service listing 106, the service manager 212 populates the service menu list within the media player 206 with the list of valid online services from the file. Prior to a new selection being made by a user from the service menu list, the last active service is present in all the customization points within the media player 206.

In general, a UI manager 218 component of the service switching and customization architecture 210 manages the display of a graphical user interface (GUI) on a computer display device. The UI manager 218 manages the GUI in conjunction with online service manager 212 and user input instructions entered through a user interface selection device (e.g. a mouse) that controls motions and selections of a pointer displayed on the GUI. Although the UI manager 218 is illustrated in FIG. 2 as being part of the online service manager 212, this is for illustrative purposes only and is not intended to be limiting. Thus, the UI manager 218 may be configured differently, such as being a stand-alone component or a part of another component on computer 102.

FIGS. 3a-3d illustrate examples of such a GUI in the form of a command bar user interface. The command bar user interface provides access to functionality for both a host application (e.g., a media player application) and a currently active media service being hosted by the host application. The command bar user interface enables switching between a plurality of online media services from within a host application. Users can switch to any one of a number of online services made available by the command bar through a service list menu. A selected online service becomes the currently active service. The currently active online service is given customization opportunities that permit customization of different areas of the user interface within the host application.

Figure 3A:
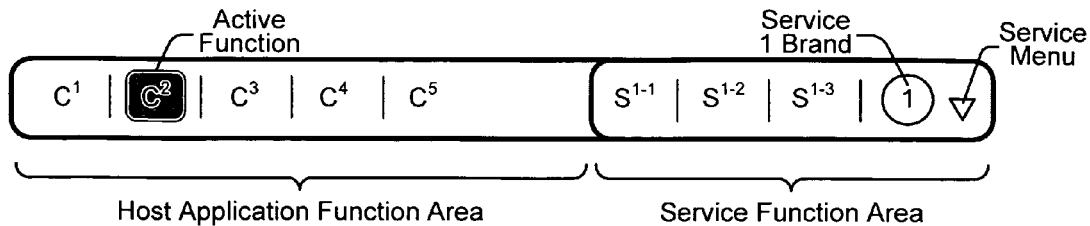
FIGS. 3a-3d illustrate examples of a command bar user interface.

Referring to FIG. 3a, the command bar user interface illustrates two regions or areas in which function buttons are displayed. A "host application function area" includes application function buttons $C^1$-$C^5$ that are intended to illustrate functions of the host application that a user can activate through the user interface. For example, if the host application is a media player application, some of the functions represented by $C^1$-$C^5$ might include a function for burning music onto a CD or a function for synchronizing content with a mobile device. Furthermore, any of the buttons $C^1$-$C^5$ could themselves be menus offering additional functionality related to the particular button. The number of application function buttons and the manner in which they are illustrated is shown in FIGS. 3a-3d by way of example only, and is not intended to be limiting. Thus, certain applications may have a greater or lesser number of application function buttons displayed in the host application function area of the command bar user interface. Note that in practice, the application function buttons may not have superscript numbers designating their functions. Rather, an application function associated with an application function button will likely be designated with a text description or a graphical representation (e.g., an icon or animation) that indicates the function.

Another region of the command bar user interface is the "service function area". The service function area includes service function buttons $S^{1-1}$-$S^{1-3}$ that are intended to illustrate functions provided by a currently active online media service and are made accessible to a user through the user interface. The service function area also includes a "Service Brand" icon and a "Service Menu" button. The superscript numbers on the service function buttons indicate that a particular online service is the currently active service and that a number of functions are available for that service. For example, service function button $S^{1-1}$ is intended to designate a first function for the currently active online media service number 1, indicated by the "Service 1 Brand" icon. Likewise, service function button $S^{1-3}$ indicates a third function for the currently active online service number 1. Note that in practice, the service function buttons may not have superscript numbers designating their functions and a particular service. Rather, service function buttons will likely be designated with a text description that indicates their function, and the currently active service may be identified by the "Service Brand" icon shown in the service function area (e.g., "Service 1 Brand"). The "Service Menu" button facilitates access to a list of valid online services as discussed more below with reference to FIG. 3c.

Referring still to FIG. 3a, the command bar user interface illustrates in the "host application function area" that a host application function has been activated by a user through the selection of application function button $C^2$. When an application function button is active, the command bar user interface typically alters the appearance of the button to indicate its active state as shown in FIG. 3a. The change in appearance can be implemented in a variety of ways including, for example, by highlighting the application button, changing the color of the application button, adjusting the texture of the application button, and adjusting a background intensity level of the application button.

Figure 3B:
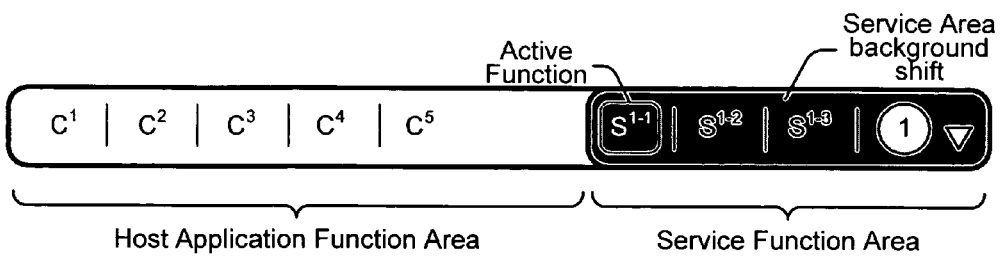

FIG. 3b illustrates that a user has selected a service function button $S^{1-1}$ from the "service function area". Thus, the user intends to implement the function associated with the $S^{1-1}$ service button which, as noted above, corresponds to the currently active online service designated by the "Service 1 Brand". As illustrated in FIG. 3b, when a service function button is selected by a user, it becomes active. The service button's active state is indicated by a change in appearance to the button. Furthermore, when an online service function is activated, the command bar interface also changes or shifts the appearance of the "Service Function Area" to indicate the active state of the online service function to the user. Thus, FIG. 3b illustrates a change in the appearance to both the service function button $S^{1-1}$ and to the service function area. The change in appearance to a service function button and the service function area can be implemented in a variety of ways including, for example, by highlighting them, changing their colors, adjusting their textures, and adjusting their background intensity levels.

Figure 3C:
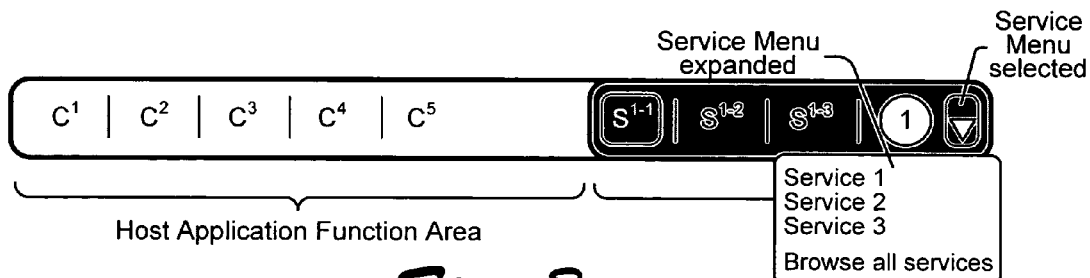

FIG. 3c illustrates use of the "Service Menu" to switch the currently active online service to a different online service. As noted in FIG. 3c, the service menu has been selected. Selection of the service menu can be indicated by a change in appearance to the service menu button, similar to that just discussed above. When the service menu is selected, a list of valid online media services appears in a drop-down menu box. A user then has the opportunity to switch the currently active online service to a different online service based on the available services within the list of valid services.

Figure 3D:
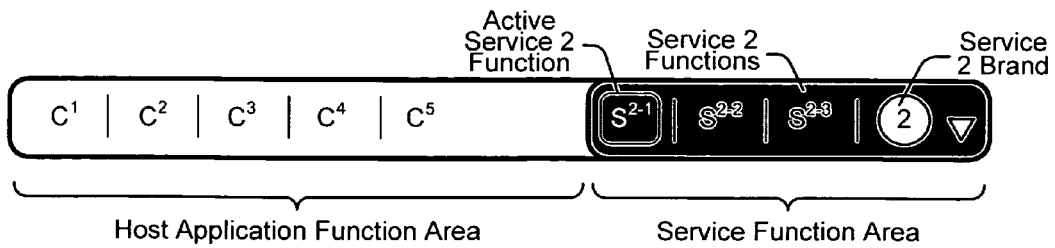

FIG. 3d illustrates the result of a selection made from the list of valid online media services appearing in the drop-down menu box of FIG. 3c. The selection the user made was "Service 2", which is indicated by the "Service 2 Brand" icon now appearing in the service function area. In addition, the service function buttons changed to correspond with the newly active online service selected by the user. Furthermore, although not illustrated in FIG. 3d, the appearance of the service function area may also change according to customizations provided by the newly active online service indicated by the "Service 2 Brand" icon.

Figure 4:
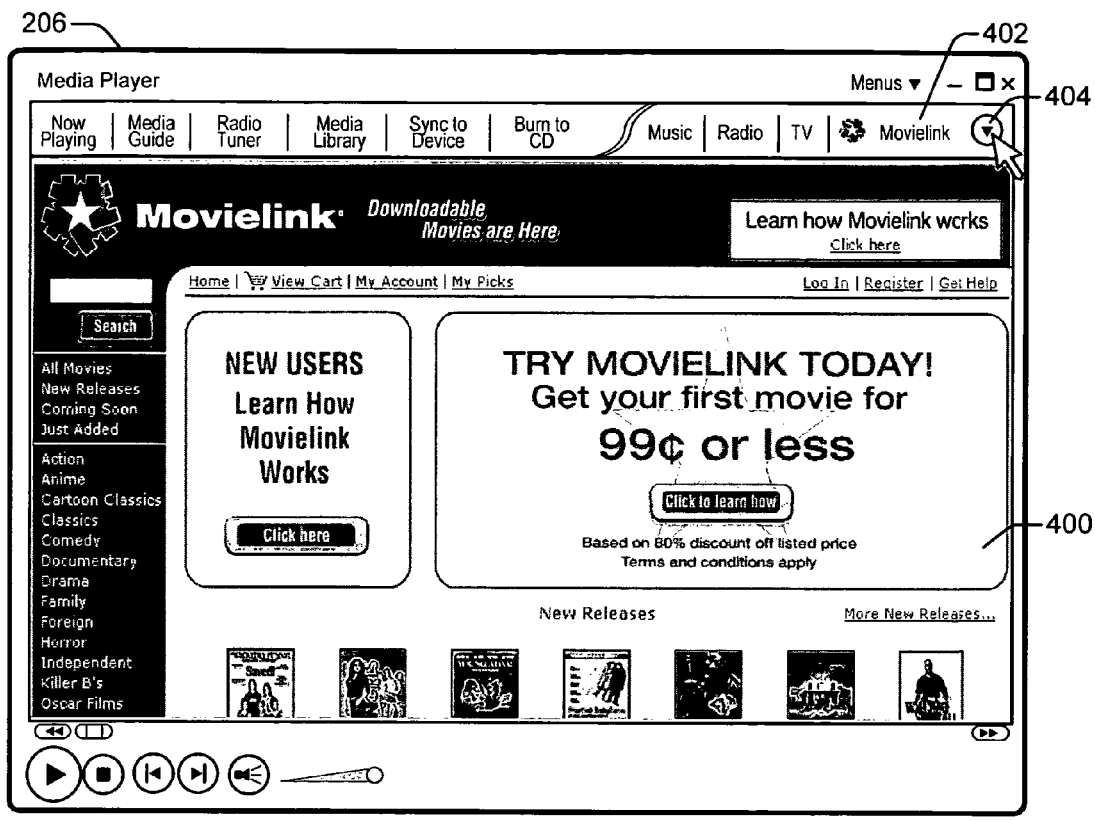
FIG. 4 illustrates an example user interface for a media player application.

FIGS. 4-7 illustrate more specific examples of how the command bar user interface described with reference to FIGS. 3a-3d might be implemented with respect to the graphical user interface of a media player 206 application. FIG. 4 illustrates an example user interface for media player 206 as it might appear on a display of computer 102. Assuming an all-services file 214 has just been retrieved, customization points such as the menu task pane 400 and the service function button area 402 in the top level command bar are still controlled by the last active service. Thus, the current service menu task pane 400 displays the HTML page associated with the last active service, which in the FIG. 4 example is "Movielink", as indicated in the service function area 402 of the command bar by the "Movielink" brand icon.

Figure 5:
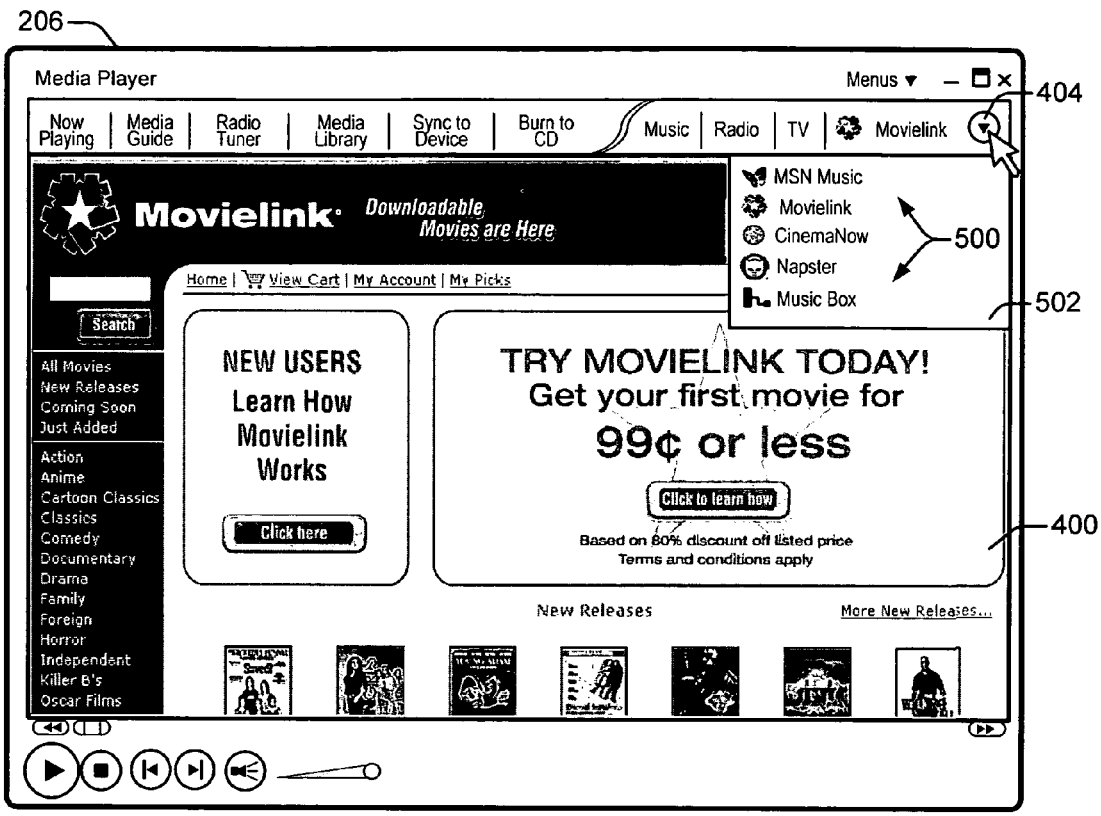
FIG. 5 illustrates an example of a list of valid online services appearing in the drop down box of a service menu.

A selection arrow is shown in FIG. 4 hovering over a service list menu button 404 in the command bar. When a user "selects" the service list menu button 404 using a user interface selection device (e.g., a mouse), a drop-down box will open up and reveal the list of valid online services from the all-services file 214. FIG. 5 illustrates an example of a list of valid online services 500 appearing in the drop-down box 502 after the service list menu button 404 has been "clicked" by a user. From the list of valid online services 500, a user can select an online service to be the currently active service. Only one service can be the active service at any one time, and the active service controls all of the customization opportunities within the media player 206, such as the service menu task pane 400, which in FIGS. 4 and 5 is controlled by the currently active "Movielink" service. Thus, a user is able to switch between the different online services 500 shown in the services drop-down box 502 and thereby change which service controls the customization points in the media player 206.

Figure 6:
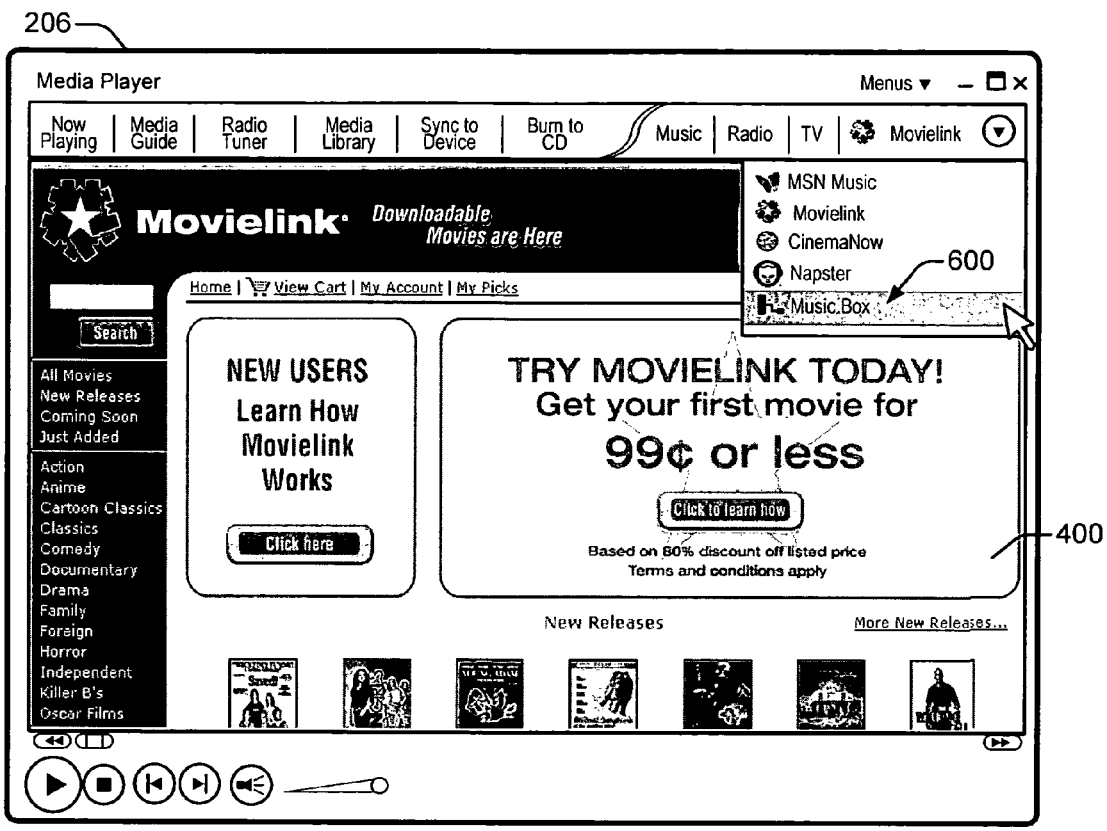
FIG. 6 illustrates an example of a selection being made of an online service that will switch an active service.
Figure 7:
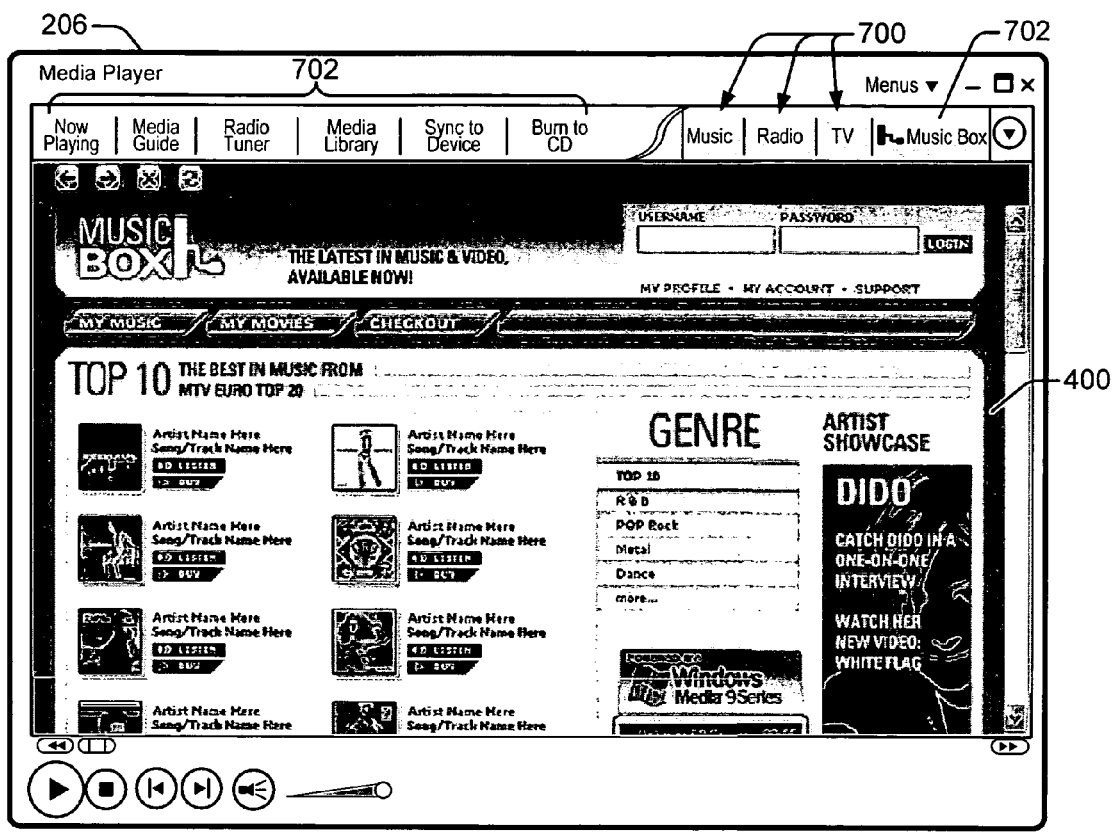
FIG. 7 illustrates a newly selected service as an active service.

FIG. 6 illustrates a selection of an online service being made that will switch the active service from the "Movielink" online service to the "Music Box" online service. Switching between these services will shift control of the customization points within media player 206 from the "Movielink" service to the "Music Box" service. As shown in FIG. 6, the "Music Box" online service has been highlighted 600 for selection. FIG. 7 illustrates the newly selected "Music Box" service as the active service. Accordingly, customization points within the media player 206 have changed according to the new active "Music Box" service and the background under the active service buttons has changed. In FIG. 7, the apparent customization points that have changed are the text and icon in the service function button area 402 and the HTML page in the service menu task pane 400. It is noted that the customization points discussed thus far are only examples of customization points, and that various other customization points also exist, some of which are discussed in greater detail below. For example, the several service function buttons 700 are customization points whose color and text descriptions can be customized by the currently active service.

FIG. 8 illustrates an example of an all-services file 214. As noted above, the all-services file 214 is an XML (Extended Markup Language) file that contains a list of valid online services and other information needed to populate a service menu list within the media player 206. Other important information included in the all-services file 214 is a URL (universal resource locator) link to a service information file 216 for each of the services listed in the all-services file 214. When a service is selected from the service menu list within the media player 206, the URL for the selected service is accessed and the service information file 216 for that service is retrieved.

Referring to FIG. 8, an all-services XML file 214 includes various elements that tell the media player 206 how to populate the initial service menu list and where to retrieve each service information file 216. These elements include <services>, <default>, <browse>, <service>, <friendlyname>, and <image> elements. The <services> element includes an optional version attribute that indicates the version of the XML file. The <default> element includes a required key attribute that is used to set the initial default service in the player on the very first use of the player. The <browse> element includes a required URL attribute that links to a "browse all services" page that matches the services that are listed in the all-services file 214. Selecting a "Browse All Services . . ." menu item will open the <servicetask1> (discussed below) and switch to a page that will list and promote partner online services. The <service> elements represent each service that is a valid service. Each <service> element includes a required key attribute that is a service key representing the service, a required XMLURL attribute that is a fully qualified URL to the service's service information file 216, an optional position attribute that indicates the initial position of the service in the service menu list, and an optional type attribute that represents whether the service can customize all customization points within the media player 206 or just the service panes within the media player 206. The <friendlyname> element includes optional text that represents the name that is shown to the user for the service. If the <friendlyname> element is not specified, the <service> key attribute is used in the player 206 wherever the <friendlyname> element is needed. The <image> element includes an optional MenuURL attribute that is a fully qualified URL to a graphic image to use on the service menu list.

As noted above, when a service is selected from the service menu list within the media player 206, the URL for the selected service is accessed and the service information file 216 for that service is retrieved. Like the all-services file 214 discussed above, the service information file 216 is preferably an XML file. Each valid online service in the all-services file 214 hosts it own service information file 216 and uses this file to manage the customization opportunities within the media player 206. Customization opportunities, or customization points, are places or areas within the media player 206 GUI (e.g., service area of command bar, task panes, etc.) that the media player gives up control over so that the active service can customize them to its own preference. Three main categories of customization can generally be described as music, video (TV, movie), and radio. Referring to FIG. 7, these categories are represented by the three service function buttons 700, whose color and text descriptions can be customized by the currently active service.

An active/selected service provides an HTML page for display in task pane 400 for one or more service function buttons 700. The HTML page typically provides access to a purchase experience. For example, an active music service may provide an HTML page that permits a user to search for a particular song or CD, after which the user can purchase and download the song or CD. A service can choose to include one or all of the three categories depending on the type of service. For example, a video service that offers only video products may only choose to use and customize the video category task tab and forego using the music and radio tabs.

In addition to the three main service function buttons 700, an active service also controls customization points regarding various media player functions (i.e., host application functions), such as those represented by the application function buttons 702 on the left side of the media player command bar shown in FIG. 7. For example, the "Now Playing" function button displays videos in the task pane 400 when a video is being played on the media player 206. However, when only audio (e.g., music) is playing on the media player, the "Now Playing" function displays either visualizations (i.e., shapes, animations, etc.) or an InfoCenter view. The InfoCenter view is an HTML page provided by the active service that typically includes useful information regarding the music that is being played by the media player at the time, such as track listings, artists, etc. Furthermore, the "Now Playing" function includes a "Buy Media" (e.g., "Buy CD", "Buy Video") shortcut link to the corresponding service function button 700 that permits a user to directly initiate a purchase experience regarding the currently playing media. Typically, the shortcut link will bypass intermediate steps such as searches, and proceed directly to a page that permits purchasing the media currently playing on the media player 206.

In addition to the "Now Playing" function as a customization opportunity for the currently active service, various other functions provide such customization opportunities within media player 206. FIG. 9 illustrates an example of a service information file 216 which includes examples of the various types of functions providing customization opportunities. Each service information file 216 includes various elements that tell the media player 206 how to customize the customization points within the player. These elements include <serviceinfo>, <friendlyname>, <image>, <color>, <servicetask1>, <servicetask2>, <servicetask3>, <infocenter>, <albuminfo>, <buycd>, <install>, and <htmlview> elements.

The <serviceinfo> element is required, and is the container element for the service information file 216. The <serviceinfo> element includes an optional version attribute that indicates the version of the XML file, and a required key attribute that is used by the media player 206 to uniquely identify the particular service. The <friendlyname> element is a required element that includes text that will be used to represent the name of the service on the service menu list in the media player 206. The <image> element is optional and it represents the graphical images that should be used to represent the service. The <Image> element includes an optional MenuURL attribute that is a fully qualified URL to a 16×16 graphic image to use on the service menu list, an optional ServiceSmallURL that is a fully qualified URL to a 30×30 graphic image to use in the chrome, and an optional ServiceLargeURL that is a fully qualified URL to a 30×60 graphic image to use in the chrome. The file formats supported include .gif, .jpg, .bmp, and .png. PNG is the preferred file format as transparency is also supported and recommended. If the MenuURL attribute isn't specified, then no graphic is used on the menu. The ServiceLargeURL attribute for the chrome service image is used if both ServiceSmallURL and ServiceLargeURL are present. If the chrome images are wider than the image area (30 or 60 depending on which element), then the image area is animated over the image area when the user selects the service.

The <color> element is optional and is used to specify the service area button color and navigation bar color. The <color> element includes a required mediaplayer attribute of hex RGB value (#FFDDCC). The <servicetask1>, <servicetask2>, and <servicetask3> elements represent the three service function buttons 700 (FIG. 7) in the service function area of the command bar. The <servicetask1> element is required, while <servicetask2> and <servicetask3> are optional. Each of the 3 elements includes a required URL attribute that is a fully qualified URL to an HTML page that will be loaded to the respective task pane when the user switches services and selects that pane, a required <buttontext> attribute that includes text that will be used as the button text for the task pane, and an optional <buffontip> attribute that includes text that will be displayed when the user hovers over the button for the task pane. The <servicetask1> element is required and is considered the primary commerce pane. The media player will launch into this pane when the user selects "Buy Media" within the player. As noted above, the three main categories of customization for these elements can generally be described as music, video (TV, movie), and radio.

The <infocenter> element is optional and is used to specify a customization of the "Now Playing" InfoCenter view. The <infocenter> element includes a required URL attribute that is a fully qualified URL that refers to an HTML page. As noted above, the <infocenter> view HTML page provided by the active service typically includes useful information regarding the music that is currently being played by the media player, such as track listings, artists, etc. The <albuminfo> element is an optional element that is used to specify a customization of the album information windows in the Burn to CD and Media Library panes. The <albuminfo> element includes a required URL that is a fully qualified URL that refers to an HTML page. The URL will be loaded into the album information window with parameters as a query. The <buycd> element is an optional element that is used to specify a purchase experience from various buy links within the media player 206. The <buycd> element includes a required MediaPlayerURL, an optional MediaCenterURL, and an optional BrowserURL that are each fully qualified URLs that refer to an HTML page for buying a CD or DVD in the media player 206. The "Now Playing" function includes a "Buy CD" shortcut link to the active service Web page that permits purchasing the media currently playing on the media player 206.

The <install> element is an optional element that is used by setup to install the default service code (if any) when setup is run online. The <install> element includes a required EULAURL that is a fully qualified URL that points to a .txt file for the code that the service wants installed, and a CodeURL that is a fully qualified URL that points to a .cab file that will be installed during setup if the service is the default service. The <htmlview> element is an optional element that is used to allow Radio .ASX files to specify a trusted HTMLView file so that the page can have access to the external .NavigateTaskPane ULR function to link deeply into a service. The <htmlview> element includes a required BaseURL that is a fully qualified URL that points to the base URL to use for any new HTMLView to allow HTML access.

Exemplary Methods

Example methods for enabling switching between various online media services and allowing an active service to customize portions of an application on a computer through a command bar user interface will now be described with primary reference to the flow diagrams of FIGS. 10 and 11. The methods apply to the exemplary embodiments discussed above with respect to FIGS. 1-9. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 10:
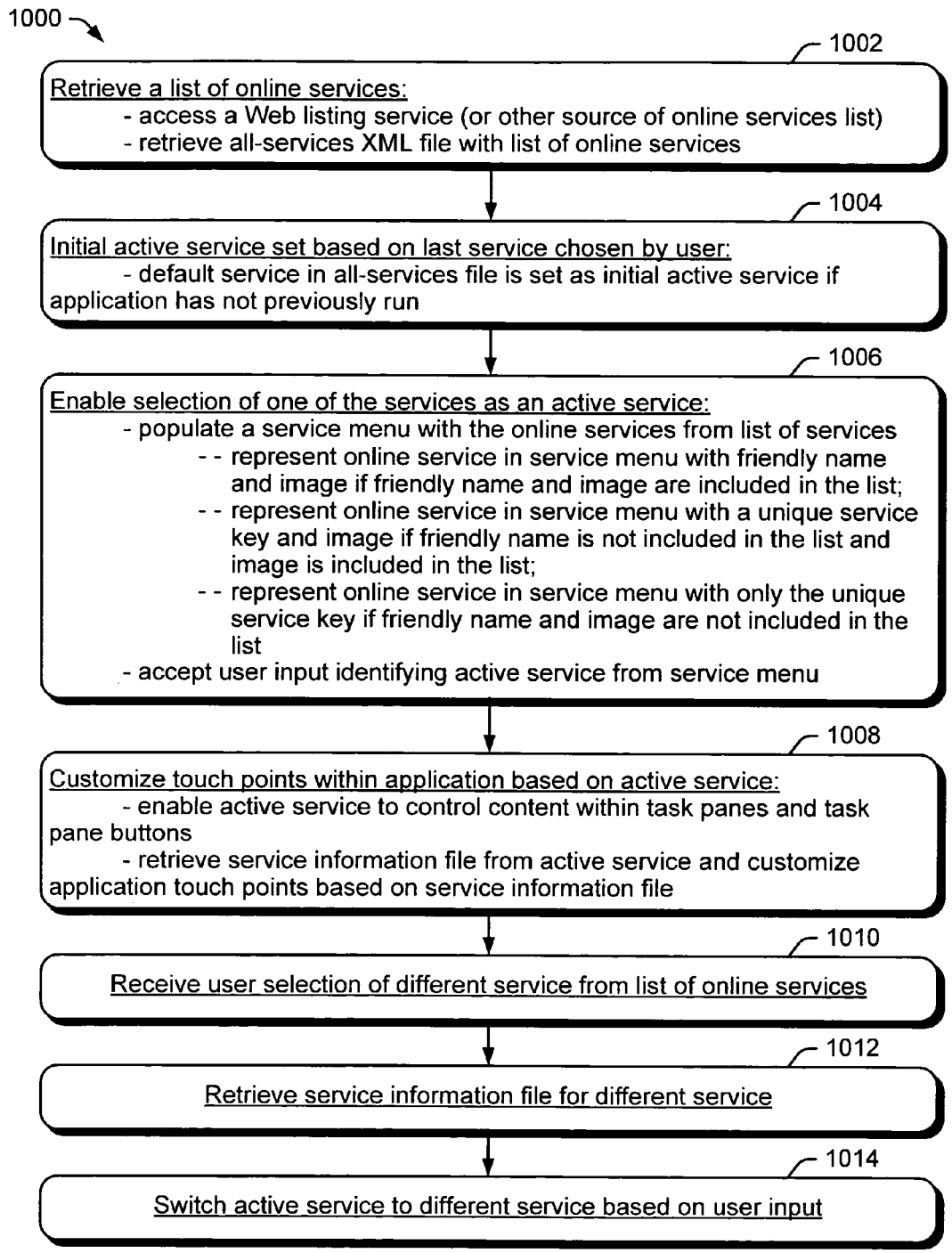
FIGS. 10-11 are flow diagrams illustrating exemplary methods for enabling switching between various online media services and allowing an active service to customize portions of an application on a computer.

Referring to FIG. 10, at block 1002 of method 1000, a list of online services is retrieved. An online service manager 212 related to an application 204 (e.g., a media player 206) executing on a computer, goes online via a network and accesses a Web listing service. The online service manager 212 retrieves an all-services XML file containing a list of valid online services and additional information. One skilled in the art will readily recognize other ways in which a list of valid online services may be retrieved. For example, the list could be hardcoded on the computer by the OEM and then retrieved by the online service manager 212. The list could also be manually constructed by a user registering a media player for a Web protocol such that when the user clicks on a special link in the Web page of a service provider, the link is received by the player and the service is added to the service list. Thus, other sources may be readily available from which the online service manager 212 can access the list of valid online services.

At block 1004, an online service is set as an initial active service based on the last active service previously chosen by the user. If the application has never run before, a default service specified by the all-services file is initially set as the active service.

At block 1006, the online service manager 212 enables the selection of one of the online services as an active service. A service menu within a media player 206, for example, is populated with the list of online services. Each online service is represented in the service menu with a friendly and a graphical image if the name and image have been included by the active service in the retrieved list of online services. Selection of one of the online services includes accepting user input that identifies which online service the user desires to make the current active service within the media player.

At block 1008, customization points within the media player 206 (or other application 204, operating system 200, etc.) are customized based on the active service. Customization includes retrieving a service information file from the active service and customizing the customization points within the media player 206 (and/or operating system shell 202 and applications 204) by enabling the active service, via the service information file, to control the content within the customization points. The customization points include, for example, task panes and task pane buttons within the media player. Customizations within a media player 206 (and/or operating system shell 202 and applications 204) can include a variety of content input and modifications made to parts of the software, including for example, identifying a name for service function button using text provided by the active service, displaying button tip text for the service function button when a selection tool hovers over the service function button, the button tip text being provided by the active service, displaying (in a task pane) an HTML page specified by the active service when a user selects the service function button. Customizations can also include displaying an HTML page from the active service within a Now Playing function button of the media player, where the HTML page provides an InfoCenter view that includes information related to music that is currently being played by the media player. Customizations can also include displaying an HTML page from the active service, where the HTML page provides album information in a burn-to-CD (compact disc) task pane and a Media Library task pane. Customizing can also include displaying a "Buy CD" link to a Web page of the active service within a Now Playing task pane, where the Web page permits purchasing the CD (compact disc) or DVD (digital video disc) that is currently playing on the media player.

At block 1010, a user input selection is received through the service menu for a different service from the available online services. At block 1012, the online service manager 212 retrieves a service information file for the different service. At block 1014, the online service manager 212 switches the active service to the different service based on the input selection made by the user.

Figure 11:
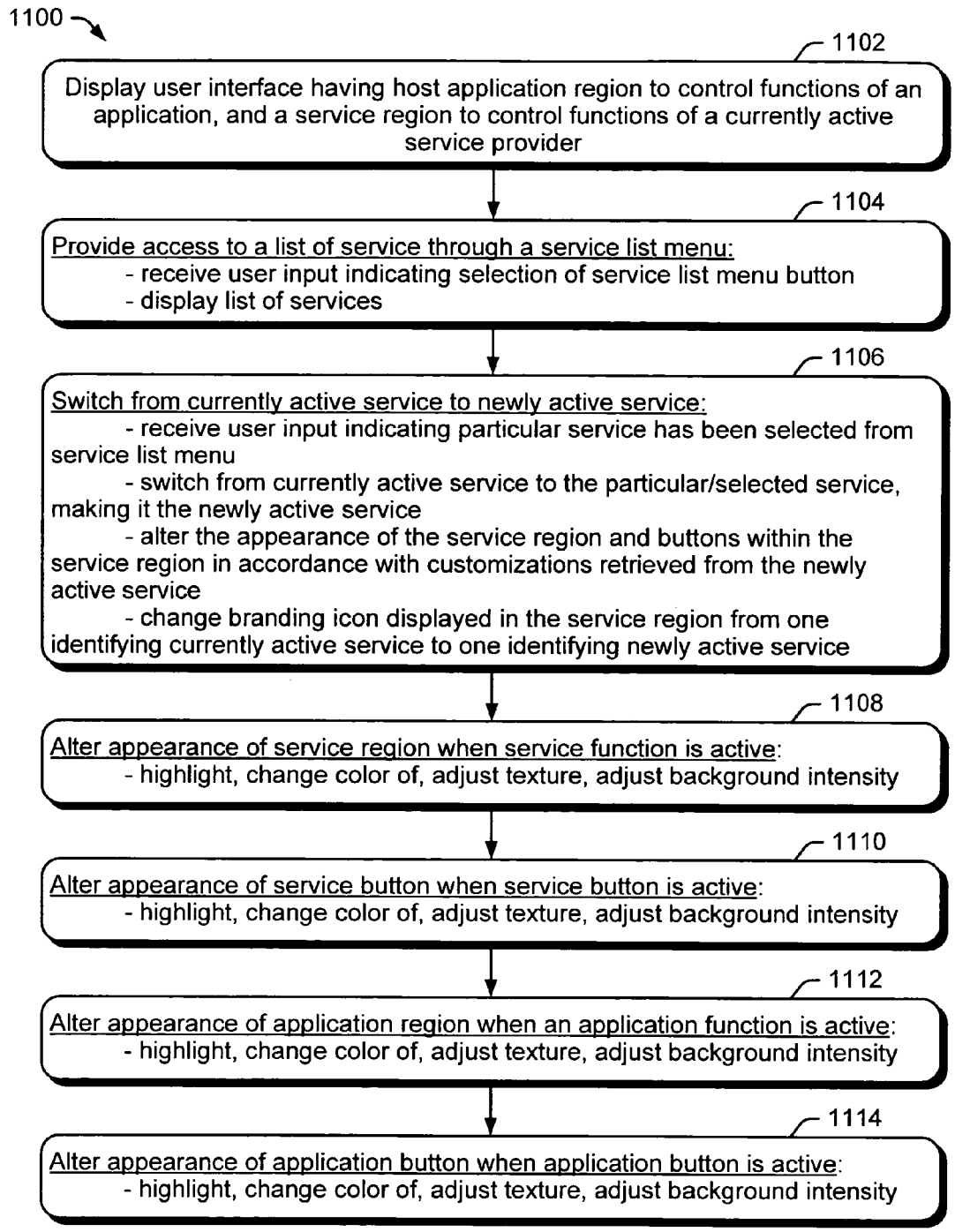

Referring to FIG. 11, at block 1102 of method 1100, a user interface is displayed. The user interface includes a command bar that has a host application region to control functions of a host application (e.g., a media player application), and a service region to control functions of a currently active service provider. The application region includes application buttons to control functions of the application and the service region includes service buttons to control functions of the currently active media service.

At block 1104, the user interface provides access to a list of services through a service list menu. User input is received through a user interface selection device (e.g., a mouse) indicating the selection of a service list menu button in the service region. The service list menu provides a drop-down box to display a list of valid services.

At block 1106, the user interface enables a switch from the currently active service to a newly active service. User input is received via the user interface selection device indicating a particular service has been selected from service list menu. In response to the user selection, the active service is switched from the currently active service to the particular/selected service, making it the newly active service. In addition, the appearance of the service region and service buttons within the service region is altered in accordance with customizations provided by the newly active service. For example, the service region branding icon is changed from one identifying the currently active service to one identifying the newly active service.

At block 1108, the appearance of the service region is altered when a service function is made active (e.g., by user input selection of the service function button). Alterations in appearance can include, for example, highlighting, changes in color, adjustments in texture, and adjust of background intensity of the service region.

At block 1110, the appearance of a service button is altered when a service button is made active (e.g., by user input selection of the service button). Alterations in appearance can include, for example, highlighting, changes in color, adjustments in texture, and adjust of background intensity of the service button.

At block 1112, the appearance of the application region is altered when an application function button is made active (e.g., by user input selection of the application function button). Alterations in appearance can include, for example, highlighting, changes in color, adjustments in texture, and adjust of background intensity of the application region.

At block 1114, the appearance of an application button is altered when the application button is made active (e.g., by user input selection of the application button). Alterations in appearance can include, for example, highlighting, changes in color, adjustments in texture, and adjust of background intensity of the application button.

Exemplary Computing Environment

FIG. 12 illustrates an exemplary computing environment for implementing a computer 102 suitable for enabling switching between various online media services and allowing an active service to customize portions of an application such as a media player as discussed above with reference to FIGS. 1-9. Although one specific configuration is shown in FIG. 12, a computer 102 may also be implemented in other computing configurations.

The computing environment 1200 includes a general-purpose computing system in the form of a computer 1202. The components of computer 1202 may include, but are not limited to, one or more processors or processing units 1204, a system memory 1206, and a system bus 1208 that couples various system components including the processor 1204 to the system memory 1206.

The system bus 1208 represents one or more of any of several types of bus structures, including a memory bus or memory controller, a peripheral bus, an accelerated graphics port, and a processor or local bus using any of a variety of bus architectures. An example of a system bus 1208 would be a Peripheral Component Interconnects (PCI) bus, also known as a Mezzanine bus.

Computer 1202 includes a variety of computer-readable media. Such media can be any available media that is accessible by computer 1202 and includes both volatile and non-volatile media, removable and non-removable media. The system memory 1206 includes computer readable media in the form of volatile memory, such as random access memory (RAM) 1210, and/or non-volatile memory, such as read only memory (ROM) 1212. A basic input/output system (BIOS) 1214, containing the basic routines that help to transfer information between elements within computer 1202, such as during start-up, is stored in ROM 1212. RAM 1210 contains data and/or program modules that are immediately accessible to and/or presently operated on by the processing unit 1204.

Computer 1202 may also include other removable/non-removable, volatile/non-volatile computer storage media. By way of example, FIG. 12 illustrates a hard disk drive 1216 for reading from and writing to a non-removable, non-volatile magnetic media (not shown), a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1225. Alternatively, the hard disk drive 1216, magnetic disk drive 1218, and optical disk drive 1222 may be connected to the system bus 1208 by a SCSI interface (not shown).

The disk drives and their associated computer-readable media provide non-volatile storage of computer readable instructions, data structures, program modules, and other data for computer 1202. Although the example illustrates a hard disk 1216, a removable magnetic disk 1220, and a removable optical disk 1224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1216, magnetic disk 1220, optical disk 1224, ROM 1212, and/or RAM 1210, including by way of example, an operating system 1226, one or more application programs 1228, other program modules 1230, and program data 1232. Each of such operating system 1226, one or more application programs 1228, other program modules 1230, and program data 1232 (or some combination thereof) may include an embodiment of a caching scheme for user network access information.

Computer 1202 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1202 via input devices such as a keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to the processing unit 1204 via input/output interfaces 1240 that are coupled to the system bus 1208, but may be connected by other interface and bus structures, such as a parallel port, game port, or a universal serial bus (USB).

A monitor 1242 or other type of display device may also be connected to the system bus 1208 via an interface, such as a video adapter 1244. In addition to the monitor 1242, other output peripheral devices may include components such as speakers (not shown) and a printer 1246 which can be connected to computer 1202 via the input/output interfaces 1240.

Computer 1202 may operate in a networked environment using logical connections to one or more remote computers, such as a remote computing device 1248. By way of example, the remote computing device 1248 can be a personal computer, portable computer, a server, a router, a network computer, a peer device or other common network node, and the like. The remote computing device 1248 is illustrated as a portable computer that may include many or all of the elements and features described herein relative to computer system 1202.

Logical connections between computer 1202 and the remote computer 1248 are depicted as a local area network (LAN) 1250 and a general wide area network (WAN) 1252. Such networking environments are commonplace in offices, enterprise-wide computer networks, intranets, and the Internet. When implemented in a LAN networking environment, the computer 1202 is connected to a local network 1250 via a network interface or adapter 1254. When implemented in a WAN networking environment, the computer 1202 includes a modem 1256 or other means for establishing communications over the wide network 1252. The modem 1256, which can be internal or external to computer 1202, can be connected to the system bus 1208 via the input/output interfaces 1240 or other appropriate mechanisms. It is to be appreciated that the illustrated network connections are exemplary and that other means of establishing communication link(s) between the computers 1202 and 1248 can be employed.

In a networked environment, such as that illustrated with computing environment 1200, program modules depicted relative to the computer 1202, or portions thereof, may be stored in a remote memory storage device. By way of example, remote application programs 1258 reside on a memory device of remote computer 1248. For purposes of illustration, application programs and other executable program components, such as the operating system, are illustrated herein as discrete blocks, although it is recognized that such programs and components reside at various times in different storage components of the computer system 1202, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. In a computer system having a host graphical user interface including a display device and a user interface selection device, a method of switching between a plurality of online services from within the host graphical user interface, the method comprising:
    displaying a media player graphical window that includes a single tool bar having both a host application function area and a service function area, the host application function area having application buttons to control functions of a host application for processing a media content, the service function area indicating an active online service for providing the media content, an active online service brand icon, service buttons to control functions associated with the active online service, and a service list menu button to display a list of valid online services and service brand icons from an all-services file;
    receiving the user input indicating a selection of the service list menu button;
    in response to the selection of the service list menu button, displaying the list of valid online services and online service brand icons;
    receiving the user input indicating the selection of a different online service from the list of valid online services;
    in response to the selection of the different online service, switching the active online service to the different online service, wherein the different online service hosts a corresponding service information file for the different online service, wherein each service file manages customization of a media player;
    altering the service buttons and providing an associated service brand icon in accordance with the customization of the different online service; and
    altering an appearance of the service function area in response to the selection of the service button, wherein the altering of the appearance is selected from the group comprising:
        highlighting the service function area;
        changing a color of the service function area;
        adjusting a texture of the service function area; and
        adjusting a background intensity level within the service function area.

2. A method as recited in claim 1, wherein altering the service buttons comprises changing the service buttons such that they control functions associated with the selected online service.

3. A method as recited in claim 1, further comprising:
    receiving a user input indicating a selection of an application button from the application function area; and
    in response to the selected application button, altering the appearance of the selected application button to indicate an active application function.

4. A processor-readable storage medium comprising processor-executable instructions configured to display a host graphical user interface on a display device and to manage the host graphical user interface in response to user input provided through an interface selection device, the host graphical user interface comprising:
    a single command bar providing access to both a host application function area and a service function area on a single row of the command bar;
    application buttons located within the host application function area to control functions of a host application;

service buttons located within the service function area to control functions associated with a currently active online media service hosted by the host application;
a service list menu button in the service function area to control switching between a plurality of online media services from within the host application, wherein the plurality of online media services host a corresponding service information file for the plurality of online services.

5. A processor-readable storage medium as recited in claim 4, the graphical user interface further comprising:
a branding icon displayed within the service function area to identify a currently active online media service.

6. A processor-readable storage medium as recited in claim 4, wherein the host application is selected from the group comprising:
a media player application;
an operating system; and
an operating system shell.

7. A computer comprising the processor-readable storage medium of claim 4.

8. A processor-readable storage medium as recited in claim 4, the graphical user interface further comprising:
branding icons displayed with the plurality of online media services upon selection of the service list menu button in the service function area.

9. A processor-readable storage medium as recited in claim 5, the graphical user interface further comprising:
the branding icon displayed within the service function area switching to represent one of the plurality of online media services selected from the service list menu button.

10. A processor-readable storage medium comprising processor-executable instructions configured for:
displaying a single user interface command bar having a host application region to control functions of a media player application, and a media service region to control functions associated with a currently active media service, wherein the displaying comprises displaying application buttons in the host application region to control functions of the media player application and displaying service buttons in the media service region to control functions of the currently active media service;
providing access to a list of media services through a service list menu button within the media service region, wherein the providing access to a plurality of media services comprises:
receiving a user input indicating the service list menu button has been selected; and
in response to the selection of the service list menu button, displaying the list of media services;
switching from the currently active media service to a newly active media service in response to a selection made from the list of media services, wherein the newly active media service hosts a corresponding service information file for the newly active media service; and
further processor-executable instructions configured for altering an appearance of the media service region whenever a function within the media service region is active, wherein altering the appearance of the media service region is selected from the group comprising:
highlighting the media service region;
changing a color of the media service region;
adjusting a texture of the media service region; and
adjusting a background intensity level within the media service region.

11. A processor-readable storage medium as recited in claim 10, wherein the switching from the currently active media service to a newly active media service comprises:
receiving a user input indicating a particular media service has been selected from the list of media services; and
in response to the selection of the particular media service, switching from the currently active media service to the particular media service, making the particular media service the newly active media service.

12. A processor-readable storage medium as recited in claim 10 comprising further processor-executable instructions configured for altering the appearance of a service button within the media service region whenever the service button has been activated to control a function of the currently active media service.

13. A processor-readable storage medium as recited in claim 12, wherein altering the appearance of a service button is selected from the group comprising:
highlighting the service button;
changing a color of the service button;
adjusting a texture of the service button; and
adjusting a background intensity level of the service button.

14. A processor-readable storage medium as recited in claim 10 comprising further processor-executable instructions configured for altering the appearance of the host application region whenever a function within the host application region is active.

15. A processor-readable storage medium as recited in claim 14, wherein altering the appearance of the host application region is selected from the group comprising:
highlighting the host application region;
changing a color of the host application region;
adjusting a texture of the host application region; and
adjusting a background intensity level within the host application region.

16. A processor-readable storage medium as recited in claim 10 comprising further processor-executable instructions configured for altering the appearance of an application button within the host application region whenever the application button has been activated to control a function of the media player application.

17. A processor-readable storage medium as recited in claim 16, wherein altering the appearance of an application button is selected from the group comprising:
highlighting the application button;
changing a color of the application button;
adjusting a texture of the application button; and
adjusting a background intensity level of the application button.

18. A processor-readable storage medium as recited in claim 10, wherein the switching from the currently active media service to the newly active media service comprises:
altering the appearance of the media service region and buttons within the media service region in accordance with a service information file retrieved from the newly active media service; and
changing a branding icon displayed within the media service region from one identifying the currently active media service to one identifying the newly active media service.

19. A computer comprising the processor-readable storage medium of claim 10.

20. A computer comprising:
a display device;
a media player application;

a user interface manager configured to manage and display a single host graphical user interface on the display device, wherein the media player application hosts an active online media service provider from which a media content can be obtained and the single host graphical user interface provides user access to functionality of both the media player application and the active online media service provider, the single host graphical user interface enables the active online media service provider to customize portions of the single host graphical user interface; and a user interface selection device enabling a user to switch the active online media service provider to a different online media service provider by using the user interface selection device to select between a plurality of online media service providers listed in a service menu on the single host graphical user interface, wherein the different online media service provider retrieves a corresponding service information file for managing customization of the media player application for the different online media service provider.

21. A computer as recited in claim 20, further comprising a command bar within the single host graphical user interface that includes a media player application function region having selectable media player application function buttons and a service function region having selectable service function buttons, wherein the user interface manager enables the active online media service provider to customize the service function region.

* * * * *

UNITED STATES PATENT AND TRADEMARK OFFICE
CERTIFICATE OF CORRECTION

| | | |
|---|---|---|
| PATENT NO. | : 7,941,761 B2 | Page 1 of 1 |
| APPLICATION NO. | : 10/993976 | |
| DATED | : May 10, 2011 | |
| INVENTOR(S) | : Judson Craig Hally et al. | |

It is certified that error appears in the above-identified patent and that said Letters Patent is hereby corrected as shown below:

In column 16, line 22, in Claim 1, delete "the" and insert -- a --, therefor.

Signed and Sealed this
Nineteenth Day of July, 2011

David J. Kappos
*Director of the United States Patent and Trademark Office*